(12) United States Patent
Rawlings

(10) Patent No.: US 6,786,425 B2
(45) Date of Patent: Sep. 7, 2004

(54) SPRAYER CONTROLLER AND METHOD

(76) Inventor: Matthew James Harold Rawlings, "Stonewold", Avon Dassett, Southam, Warwicks (GB), CV47 2AE ( * ) Notice: Subject to any disclaimer, the term of this patent is extended or adjusted under 35 U.S.C. 154(b) by 68 days.

(21) Appl. No.: 09/730,757

(22) Filed: Dec. 7, 2000

(65) Prior Publication Data

US 2002/0071916 A1 Jun. 13, 2002

Related U.S. Application Data

(63) Continuation-in-part of application No. 09/424,568, filed as application No. PCT/GB98/01546 on May 27, 1998, now Pat. No. 6,341,760.

(30) Foreign Application Priority Data

May 27, 1997 (GB) .............................................. 9710834

(51) Int. Cl.[7] .......................... A01G 27/00; B05B 1/14; A62C 37/20
(52) U.S. Cl. ........................ 239/67; 239/550; 239/551; 239/562; 239/DIG. 15
(58) Field of Search ............................. 239/63, 67, 71, 239/533.1, 533.15, 159, 172, 163, 407, 170, 76, 550, 551, 562, DIG. 15; 251/61.4, 61.5, 63.5, 63.6; 222/57, 55, 52, 491, 496, 484, 485; 137/115.25, 115.23, 487.5, 488, 492, 557

(56) References Cited

U.S. PATENT DOCUMENTS 2,966,172 A * 12/1960 Smith ...................... 137/627.5
4,121,767 A * 10/1978 Jensen .......................... 239/71
4,530,463 A * 7/1985 Hiniker et al. ................. 239/71
4,723,709 A * 2/1988 Curran et al. ................ 239/110
4,872,638 A * 10/1989 Thompson et al. ........... 251/54
5,002,086 A * 3/1991 Linder et al. ................ 137/312
5,014,914 A * 5/1991 Wallen.ang.s ................. 239/62
5,040,768 A * 8/1991 Minami et al. ............. 251/63.6
5,288,052 A * 2/1994 Black et al. .............. 251/30.01
5,772,114 A * 6/1998 Hunter ......................... 239/67
5,787,925 A * 8/1998 Ollivier .................... 137/489.5
5,967,176 A * 10/1999 Blann et al. ............. 137/489.5
6,193,166 B1 * 2/2001 Miller et al. .................. 239/76

OTHER PUBLICATIONS

U.S. patent application Ser. No. 09/730,757, filed Dec. 7, 2000.
U.S. patent application Ser. No. 09/424,568, filed Nov. 24, 1999.

* cited by examiner

*Primary Examiner*—Michael Mar
*Assistant Examiner*—Darren Gorman
(74) *Attorney, Agent, or Firm*—Arent Fox PLLC; Wilburn L. Chesser

(57) ABSTRACT

A device for delivering a controlled dose of a fluid to an outlet from a fluid supply at an operating pressure which includes an actively operable check valve and pressure exerting means to selectively exert first and second pressures on the check valve. When one of the first and second pressures is exerted on the check valve, the valve prevents the passage of fluid at operating pressure through the outlet. When the other pressure is exerted on the check valve, the valve permits the passage of spray fluid at operating pressure. Signal generating means to generate a control signal characteristic of the fluid operating pressure, and control means derive at least one of the said first and second pressures from the control signal.

7 Claims, 8 Drawing Sheets

SPRAYER CONTROLLER AND METHOD

CROSS REFERENCE TO RELATED APPLICATIONS

This application is a continuation-in-part of U.S. patent application Ser. No. 09/424,568 titled "IMPROVEMENTS IN METERING DEVICES" filed Nov. 24, 1999 now U.S. Pat. No. 6,341,760 which is a 371 of PCT/GB98/01546 filed May 27, 1998.

FIELD OF THE INVENTION

This invention relates to a sprayer controller, and particularly to a sprayer controller which controls sprayer check valves and spray nozzles.

BACKGROUND TO THE INVENTION

Sprayers are used in agriculture and horticulture for applying chemicals and/or liquid fertilisers to growing crops, and for the treatment of harvested produce.

Generally, sprayers have a series of outlets across the width of the sprayer boom. Each outlet through which liquid is passed is provided with a check valve, commonly known as an Anti Drip Check Valve, and the check valve is generally equipped with a means to attach a nozzle or applicator on the downstream side of the check valve. Check valves are provided to prevent liquid flowing from the outlets when the said liquid is below a predetermined pressure. For example, a check valve may be set up so that liquid may not pass through the valve unless the liquid is at the intended working or application pressure, referred to hereinafter as the operating pressure.

The most common type of check valve used in agricultural and horticultural sprayers is a mechanical device and comprises a sealing diaphragm maintained against a sealing face by a compressed coil spring, the spring rate, or loading of which is determined by the pressure at which the valve is required to open and the surface area of the sealing diaphragm.

Other types of check valve are known, for example the check valve described in UK patent application no 9710834.4, and PCT/GB98/01546, the AirSTOP AS-200 valve available from KZCO Incorporated, the Air Chemsaver manufactured by Spraying Systems Co, and an air/spring operated valve described in FR-A-2515304.

Sprayer booms generally comprise a plurality of boom sections. This is so that the boom which may be 40 meters wide may be folded down to a width narrow enough to be transported on public roads. Also, it is convenient to be able to divide the boom into discrete sections which can be controlled individually. It is common for a sprayer boom to have a number of sections, and for the supply of liquid to each section to be controllable independently from the other sections. This is generally achieved by placing ball valves or other similar valves in the spray lines to each section so that the flow of liquid to any desired section can be shut-off, whilst the other sections continue to spray.

The types of valve used to control the flow of fluid to a boom section are relatively expensive, slow and heavy, as is the control equipment required to operate them. Increasing the weight of a sprayer boom is undesirable. Furthermore, it is only possible to control the flow of fluid to any one group of nozzles, i.e. all the nozzles on a particular boom section.

It would therefore be desirable to provide a sprayer controller which does not suffer from the disadvantages suffered by currently available equipment.

SUMMARY OF THE INVENTION

This invention includes aspects or features of applicant's copending U.S. patent application Ser. No. 09/424,568 of Matthew James Harold RAWLINGS titled "IMPROVEMENTS IN METERING DEVICES" filed Nov. 24, 1999, which is hereby incorporated by reference.

The invention provides a device for delivering a controlled dose of a fluid to an outlet from a fluid supply at an operating pressure, the device comprising an actively operable check valve, pressure exerting means to selectively exert first and second pressures on the check valve such that when one of the first and second pressures is exerted on the check valve the valve prevents the passage of fluid at operating pressure through the outlet, and when the other pressure is exerted on the check valve the valve permits the passage of spray fluid at operating pressure, characterised by signal generating means to generate a control signal characteristic of the fluid operating pressure, and control means for deriving at least one of the said first and second pressures from the said control signal.

The invention also provides a controller for a liquid spraying apparatus comprising at least one spray line provided with at least one outlet, each outlet being provided with an actively operable check valve, signal generating means to generate a control signal characteristic of the spray fluid pressure, pressure exerting means to selectively exert first and second pressures on the check valve, wherein at least one of the said first and second pressures is derived from the said control signal, wherein when one of the first and second pressures is exerted on the check valve the valve prevents the passage of spray fluid at operating pressure, and when the other pressure is exerted on the check valve the valve permits the passage of spray fluid at operating pressure.

The or each outlet may be provided with a nozzle or an applicator.

The first and second pressures may be derived from the said control signal.

The first pressure may be less than the spray operating pressure and the second pressure may be greater than the spray operating pressure. The first pressure may be 0.05 bar less than the spray operating pressure, and the second pressure may be 0.05 bar greater than the spray operating pressure.

The first and/or second pressures may follow the fluid spraying pressure, so that the first and/or second pressures is/are only fractionally greater or less than the spraying fluid operating pressure.

The pressure exerting means may comprise pressurised fluid, such as air, electrically or electronically powered actuators, or hydraulic actuators.

The said first and second pressures may be proportional to the said control signal. Alternatively, the said first and second pressures may be a differential of the said signal. The first and second pressures may be a fixed percentage of the spray fluid pressure irrespective of the actual spray fluid pressure.

The signal generating means may comprise a pressure transducer attached to the spray fluid line. The signal may be generated as a mathematical relationship to a measured parameter of the spray fluid circuit, the signal generating means comprising means to measure the said parameter.

When the said first pressure is exerted on the check valve, the said valve functions as a check valve, the check valve being actuated when the spray fluid pressure falls below a pre-determined value. Where the operator does not want spray fluid to flow through the nozzles until the pressure falls below the said predetermined value, he switches the controller so that the second pressure is exerted on the check valve which is higher than the spray fluid operating pressure, thereby providing substantially instantaneous shut off.

In the case of pneumatically operated check valves, low pressure and high pressure air lines may be provided, an exhaust being provided to permit the high pressure to decay, and preferably the low pressure air line supplies air to the check valves through the high pressure air line. Preferably, the controller limits the time during which the exhaust valve may be opened, thereby limiting the volume of air which can pass therethrough, and hence the fall in pressure in the check valves. The controller may comprise means to vary the time for which the exhaust valve is opened. In one embodiment opening the exhaust valve for 0.1 seconds allows the air pressure to decay sufficiently.

Air pressure in a pneumatic system may be controlled electronically or low-mechanically.

Preferably, air is distributed to the check valves, individually or in groups, through at least one manifold comprising a plurality of valves. The manifold valves may be actuated electrically, or electronically. Advantageously, a manifold may be provided in each of the high and low-pressure airlines.

Preferably, a 24 Volt DC supply is provided to power the electric and electronic components of the controller.

In one embodiment of the invention, the check valves are of the type where a force is exerted on a diaphragm against the spray fluid pressure to prevent flow thereof through the check valve. For these types of valve, when a pressure greater than the spray fluid operating pressure is exerted on the diaphragm the valve closes, and when a pressure smaller than the spray fluid operating pressure is exerted on the diaphragm the valve opens.

In another embodiment of the invention, the check valves comprise a piston held against a seal by means of a spring, the spring exerting a force greater than the spray fluid operating pressure to hold the check valve shut. A force must be exerted against the spring to open the valve to allow fluid to flow therethrough. To open this type of valve a pressure greater than the spray operating pressure (and the spring pressure) must be exerted on the check valve; whereas exerting a pressure lower than the spray operating pressure allows the valve to close. Traditionally, to close the valves the air holding them open has been allowed to vent to atmosphere. However, this uses much air, and delays the time available to reopen the valves.

In another embodiment of the invention, a check valve comprises a rolling diaphragm mounted about a piston arrangement which acts on another diaphragm which creates a seal between the inlet and outlet of the valve. This arrangement allows for a differential to exist between pressures used for first and second operating means and actual spraying pressure so that a low air pressure can be used to shut off a higher fluid pressure. The reduction in air pressure required to activate the valve means that less air is actually consumed during operation which allows smaller air supplies to be used, saving energy and increasing speed of response. The rolling diaphragm provides significant advantages in that it is effectively free of friction because there are no sliding or rotating parts; this makes the valve sensitive particularly where the actuating pressures are low and affords control of the valve operation very precisely. It also means that the valve requires no lubrication in order to function properly and does not suffer from "sticking" or slow operation which is associated with sliding piston seals which use 'O' Ring type seals, and therefore affords long trouble free life in the type of applications to which the invention relates. A spring may be incorporated to act on the rolling diaphragm/actuator piston arrangement and exert a force greater than the spray fluid operating pressure to hold the check valve shut. A force must be exerted against the spring to open the valve to allow fluid to flow therethrough. To open this type of valve a pressure greater than the spray operating pressure (and the spring pressure) must be exerted on the check valve; whereas exerting a pressure lower than the spray operating pressure allows the valve to close.

The sprayer may be provided with two or more sets of outlets, each outlet being controlled by a check valve. The outlets may closely adjacent one another. Each check valve, and therefore outlet may be operated independently, thereby permitting the operator to vary application rates. Preferably, the nozzles in the different sets have different output characteristics.

The invention provides a fitting comprising a chamber and having one inlet and two outlets, each outlet being provided with a check valve. The check valve being as described above, for example an actively operable diaphragm valve, or a spring/piston check valve.

The controller may be arranged to control only the check valves.

Alternatively, the controller may comprise part of the main sprayer controller, and the control signal may be interpreted from a measurable sprayer parameter.

The invention also provides a controller for a liquid spraying apparatus comprising at least spraying line provided with at least one outlet, each outlet being provided with an actively operable check valve, signal generating means to generate a control signal characteristic of the spray fluid pressure, pressure exerting means to selectively exert first and second pressures on the check valve, wherein at least one of the said first and second pressures is derived from the said control signal, wherein when one of the first and second pressures is exerted on the check valve the valve prevents the passage of spray fluid at operating pressure, and when the other pressure is exerted on the check valve the valve permits the passage of spray fluid at operating pressure, wherein the controller further comprises a flow or pressure setting means to set the flow or pressure in the or each spray fluid line for a specific speed of sprayer in the direction of travel, and wherein variation of the speed causes a corresponding variation in the flow or pressure.

Alternatively the controller may regulate the operating pressure of the sprayer at a fixed setting irrespective of ground speed variation.

The flow or pressure setting means may comprise a motorised valve, or an air operated flow or pressure setting means. One known type of air operated flow or pressure setting means is the "Ramsay Pressure-set" available from Ramsay Soil Injection Ltd. Alternatively the Flow setting means may comprise individual or groups of check valves being actuated from the OFF position to the ON position at frequencies which vary in particular proportion to changes in speed whilst liquid at a fixed operating pressure is being delivered to them. Alternatively the Flow setting means may comprise individual or groups of check valves being actuated between the OFF position and the ON position for varying times in each position using Pulse Width Modulation (PWM) with the control characteristics for this function varying in particular proportion to changes in speed whilst liquid at a fixed operating pressure is being delivered to them. Either of these flow setting means may be implemented using pneumatically operated valves of the type previously described in PCT/GB98/01546 or an electronically actuated diaphragm also as described in this reference, or electronically actuated piston type spool valves. Furthermore, the flow control means may comprise a single valve of the type described, or a through chamber fitted with a strangulating diaphragm, such as a pinch valve, which can be switched between the first and second positions thereof at varying frequencies, or by modulating the duty cycle as previously described herein.

The controller preferably comprises means to reset the flow or pressure setting so that when the speed of the sprayer has increased causing an increase in pressure, the pressure setting means can be reset to a desired pressure. This facility is important where a nozzle has particular pressure limits. The controller may comprise pre-set limits which provide a warning when the speed of the sprayer has varied to such an extent that the pressure in the spray line is outside the pressure band for the particular nozzle.

If a nozzle or group of nozzles is switched off, the pressure setting means adjusts itself to divert more liquid back to the sprayer tank, thereby keeping the pressure constant. Alternatively, the operator may wish to control the application rate rather than the application pressure.

The controller may comprise a setting dial which allows the operator to set a desired application rate, i.e. flow rate. The flow rate is actually derived from a pressure setting, for example using the equation Q=K*(P)0.5 where Q=Flow, K=a flow constant and P is the pressure. The flow constant K is a known value for a particular nozzle and is inputted into the controller, for example by using a setting dial.

Different liquids have different specific gravity. The above formula is multiplied by 1/specific gravity to give the actual flow rate. The controller may be provided with a setting dial to allow the specific gravity of the fluid to be sprayed to be inputted into the controller.

The above-mentioned equations are programmed into the controller and are used when setting the sprayer according to flow rate or pressure.

If the operator wishes to control flow rather than pressure he sets the desired application rate for the expected speed of travel of the sprayer. As the speed moves away from the expected speed the effective application rate changes. The controller may comprise indicators to indicate to the operator that the speed of travel has changes to such an extent that the application rate has fallen outside an acceptable band. The operator then resets the flow rate if he wants to continue at the changed speed.

As the speed of travel changes so does the spray fluid pressure in order to maintain a constant flow rate.

Alternatively if the controller is operating valves designed to be switched ON and OFF at varying frequencies or to have time of opening modulated the pressure in the spray line will remain constant but the flow passing through the individual outlet or section will vary. The controller will monitor the mode of operation and internally calculate the volume which is passing through the sprayer in a relevant manner and adjust in accordance with the operators desired setting.

The signals generated within the controller may be interpreted to provide information such as area covered, work done, volume sprayed, etc. The controller may comprise a microprocessor to store such information, and the controller may comprise means to permit such information to be downloaded, for example to a personal computer. Means may be provided to permit the controller to be loaded with information, for example data from mapping programs, which may cause check valves to open and close according to the changing needs of a particular field.

Where the sprayer comprises a second set of outlets, the controller may be arranged to open and close these outlets.

Where the sprayer is fitted with check valves of the type which can be switched rapidly or modulated, the controller may be arranged to regulate the frequency of operation or level of modulation between one check valve and another so that variation of flow rates can be achieved across the sprayer width.

The sprayer may receive command information in addition to speed and operator settings via a GPS coordinated mapped input or real time visual imaging system (monitoring and assessing crop characteristics immediately in front of the sprayer and responding by issuing commands for specific dosing of chemical or fertiliser being applied) which controls differing rates of chemical or fertiliser to be applied at each of the outlets or at different groups of outlets.

Another embodiment of the invention provides a sprayer comprising spray lines fitted with valves of the type described and control means to operate said valves, fitted at each outlet, rapidly by switching the valves ON and OFF and which can regulate the flow and or pressure of the liquid passing through said outlet, to which is fitted a fixed nozzle having a known spray characteristic, so that liquid exiting from the said nozzle can be distributed in droplets of consistent size, irrespective of the changes in flow or pressure. The control means is arranged to regulate the frequency at which the said valves switch ON and OFF so that the droplet size for the given nozzle is maintained as ground speed, pressure or flow changes occur. Such equipment would have significant benefits because low volumes of liquid could be applied through nozzles which have beneficial droplet characteristics but which would normally require high fluid flows to generate these. For instance, a Flat Fan spray nozzle designed to apply 200 l/ha is recognised as providing a droplet in the industry-accepted medium-sized category. The size of droplet generated is accepted as being the most beneficial way to apply many chemicals because it provides optimum contact with the plants being sprayed, carries sufficient active ingredient and because the droplets are not unduly susceptible to drift away from the target which might be caused by light winds or machine movement in the crop. If the operator wished to apply a half dose at 100 l/ha the 200 l/Ha type nozzle would no longer generate the correct spray pattern or droplet size, and he would have to fit a 100 l/ha nozzle. In such a case the 100 l/ha nozzle would be likely to generate droplets of smaller size which would not necessarily deposit correctly and which would be more susceptible to drift. By using rapid on-off switching of the flow to the nozzles, as hereinbefore described, the 200 l/ha nozzle could be controlled so that it only opened for 50% of the time, so that 100 l/ha effectively passed through it, but in doing so the correct droplet size and spray pattern would be generated. Given that in most cases nozzles are designed to provide a spray pattern which provides a 50% overlap with each adjacent nozzle, the control means would be arranged to control the outlets on a spray boom so that, when one nozzle was switched OFF, its neighbour would be ON, and vice versa. This would ensure that at any one time the whole width under the spray boom would be receiving spray and no gaps would exist.

The frequency at which the valves would be switched might vary between 2 Hz and 50 Hz depending on the speed or desired rate of application. The system as described has the significant advantage of being able to accurately reduce the amount of chemical being applied whilst maintaining accepted environmentally and biologically beneficial spray characteristics.

Another embodiment of the invention provides a sprayer comprising a tank provided with a feed line which extends from and returns to the tank, wherein the feed line is provided a valve to control the return of fluid in the feed line to the tank. Advantageously, the sprayer is provided with a controller and the said valve is controlled by the controller.

The sprayer is preferably provided with a pressure regulator which maintains the pressure in the feed line constant.

Preferably, the valve is an actively operated check valve, which may be of the diaphragm, spring/diaphragm, or spring piston type. The check valve may comprise a rotary metering valve.

Alternatively, the valve may be a regulating valve such as a rotary valve, or a gate valve.

The provision of this feature allows chemical solutions to circulate constantly through the feed lines of sprayer boom even when the sprayer is not operating, so that the chemical remains mixed and available to the outlets at the required spraying pressure at all times. The re-circulation of liquid suspensions such as fertilisers is extremely desirable to ensure that they are applied to crops in a consistent solution and this feature provides a means of achieving this, and also prevents blocking of nozzles or applicators which can occur when a liquid suspension degrades.

The valve provided in the feed line to control the return of fluid in the feed line to the tank may be used to allow re-circulation during spraying. Where the valve is a check valve according to the invention the outlet of the valve may be of a size which permits a desired re-circulatory flow rate when the check valves controlling the flow of fluid through the sprayer nozzles are open. By combining a rotary metering valve with the check valve, different re-circulatory flow rates can be provided for. Alternatively, a regulating valve may be used in the feed line. In each case the position of the valve may be controlled by the controller.

Another benefit of the valve in the feed line to control the return of fluid in the feed line to the tank, is that a further means of controlling the flow rate of fluid through the sprayer nozzles is provided. This is because a proportion of fluid which would have passed through the nozzles is being returned to tank.

In another aspect of the invention the check valve of the invention is adapted to provide an accurately controlled infinitely variable metering valve which enables chemical to be pressured into or entrained into a fluid flow. Alternating between first and second pressures of the valve rapidly or modulating this function whilst the valve is connected to a neat chemical supply at fixed or variable pressure and controlling the level of this activity will enable variable but proportional volumes of liquid to pass through the valve. The check valve may be fitted with accurate metering orifices or the like. The control of the operating means might be integral within the main sprayer controller or independent of it. The generation of first and second pressure means might be dependent on the main sprayer function or independent of it. The type of valve adapted for this type of use may be a pneumatically actuated diaphragm valve, a hydraulically actuated diaphragm valve, an electronically actuated solenoid diaphragm valve, a piston type valve controlled by any of these means or alternatively a rolling diaphragm valve or strangulating diaphragm valve actuated by any of these means.

In such an embodiment the requirement to mix quantities of chemical with water in the main sprayer tank is removed. The main sprayer tank can be filled with water and chemical added to the required solution at the point at which the main spray line feed enters the feed lines to the sprayer outlets. Alternatively chemical could be delivered directly to the individual outlets and a valve of the type described provided with control means would regulate the volume of chemical being admitted to the water flow at the point of exit. Clearly a system such as described has significant advantages because only that chemical which is required is actually applied, saving costly chemical and removing the likelihood of premixed chemicals remaining unused, as can occur in a conventional type of sprayer, which presents a problem of environmentally detrimental waste disposal.

The invention further provides a method of spraying liquid from a nozzle on to a surface which is moving relative to the nozzle, the nozzle being of the type comprising a check valve selectively operable to switch between a first state, in which liquid is prevented from passing through the nozzle and a second state in which liquid is allowed to flow through the nozzle, the method comprising supplying liquid to the nozzle at a pressure predetermined to generate a desired pattern of spray and quality of spray from the nozzle, and cycling the check valve between the first and second states so as to deliver spray to the surface at a rate less than the constant rate delivered by the nozzle at the predetermined pressure.

The invention also provides a method of metering the delivery of liquid from a pressurised supply through an outlet, the outlet comprising a check valve selectively operable to switch between a first state, in which liquid is prevented from passing through the outlet and a second state in which liquid is allowed to flow through the outlet, the method comprising cycling the check valve between the first and second states and controlling the relative amount of time in the first and second states to control the flow rate of liquid through the outlet.

The use of a spray line re-circulating function as previously described, achieved using valves featuring first and second operating means, in conjunction with a system for entraining chemical directly into a fluid flow down stream of the main pump has the advantage that it draws chemical rapidly to the individual outlet and effectively allows the spray line to be charged with chemical solution in advance of spraying being commenced. Where re-circulation is incorporated, the return line from the far end of the spray line would have to be configured so that it re-entered the spray line downstream of the chemical admission point, removing the possibility of contamination with clean carrying fluid. The controller could be configured to acknowledge if the spray line is operating in a re-circulating mode and to adjust or close the chemical admission valve so that the solution of chemical does not exceed the required or preselected rate. Thus, the rate can be adjusted to provide the correct amount of chemical admission relative to the number of outlets being opened.

This feature would provide a significant benefit over other types of chemical injection systems fitted to conventionally arranged sprayers, which can only operate whilst outlets are actually depositing liquid, with the result that, when a sprayer is initially switched on, clean liquid from the sprayer tank is pumped via the chemical admission point and then on to the outlets, leading to time delays. Correspondingly, if the operator has carried out the standard procedure of cleaning out spray lines after a previous application, the liquid remaining in the spray lines must be emitted from the outlets before the chemical solution can exit. When chemical of the desired or pre-set solution actually exits from the outlet then becomes a matter of guesswork, and the operator may be obliged to remain static with the sprayer pumping liquid out until such time as they decide proper solution chemical is at the outlets, which might damage proximal flora, fauna or crop, or alternatively the operator might commence spraying with a dilute solution of unknown strength or efficacy until such time as all liquid in the spray line is that which has passed the chemical admission point.

The invention removes the requirement for conventional boom section controls, since the operator can shut-off any particular outlet, or boom section by switching the controller so that the second pressure is exerted on the check valve. Furthermore, when the controller is connected to a DGPS or GPS system the application at any one point in a field can be controlled easily and accurately.

The arrangement also permits the sprayer to be equipped with one single feed line for the spray boom as opposed to sprayers of the prior art which have a plurality of fluid supply lines, the number of supply lines corresponding to the number of sections on the boom.

In the case where the controller of the invention controls the whole sprayer, the controller is far simpler than known controllers which comprise feed back systems linked to pressure and volume transducers. The only variable input to the controller is speed. This can simply provide the operator with indications that he needs to take action. However, such action can be automated so that when the speed goes outside a particular band, the pressure or volume setting is automatically changed so that the pressure or volume does not fall outside the effective working range of the nozzles or applicators attached to the outlets.

The sprayer controller of the invention enables the time delay during the build up to operating pressure following check valve shut-off and resumption of spraying to be kept to a minimum. Where the check valve is a diaphragm check valve, the speed at which the check valve operates can be adjusted by varying the pressure exerted on the diaphragm by the pressurising means. Increasing the pressure increases the speed of operation of the check valve.

BRIEF DESCRIPTION OF THE DRAWINGS

In the drawings, which illustrate exemplary embodiments of the sprayer controller of the invention.

DETAILED DESCRIPTION OF THE PREFERRED EMBODIMENTS

Figure 1:
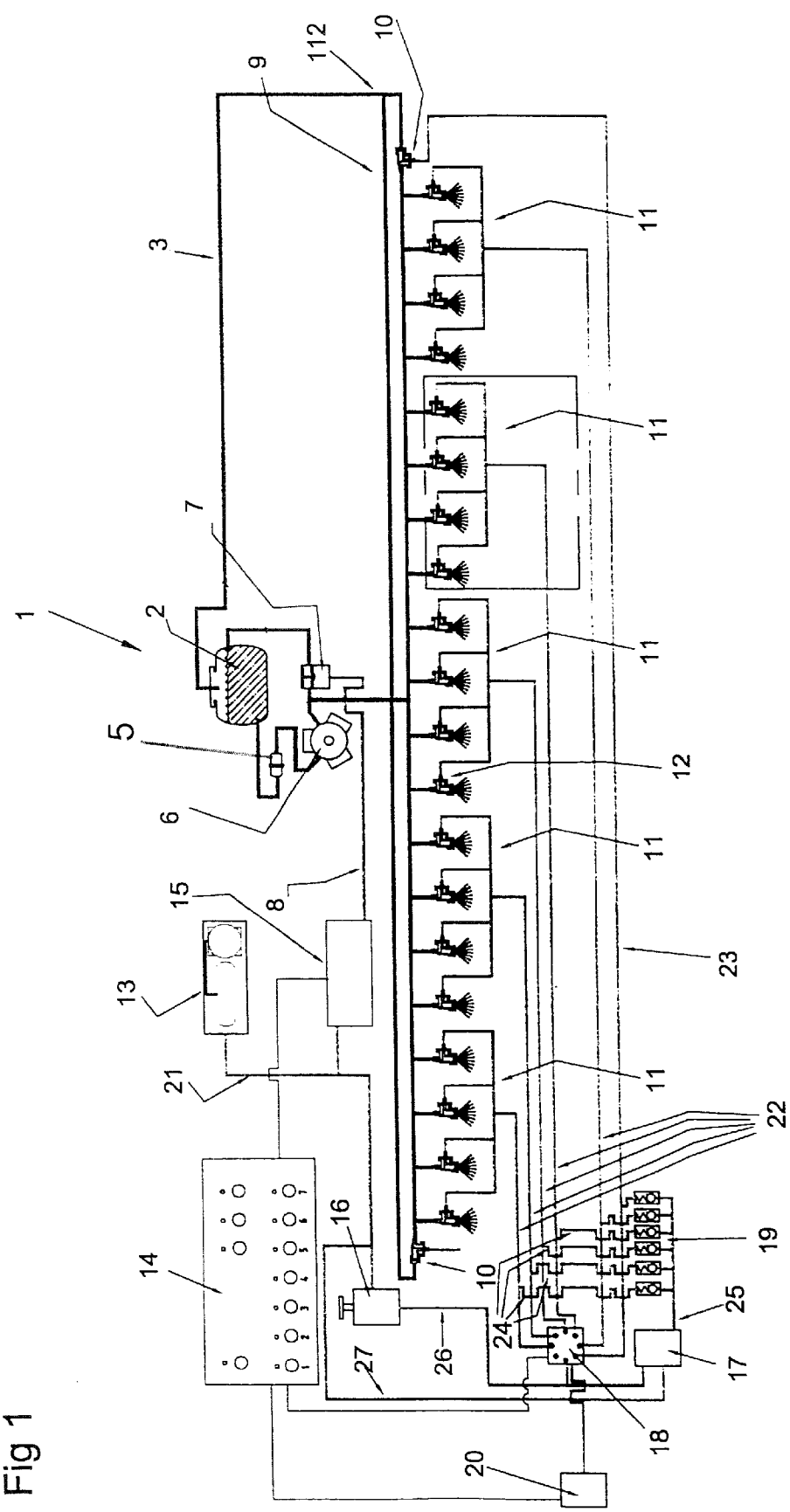
FIG. 1 is a schematic representation of a sprayer having a controller according to the invention.

Referring now to FIG. 1, there is shown a sprayer 1 having a tank 2, a filter 5 and a pump 6. The pump draws fluid from the tank through the filter and then pumps it into the feed line 8 and the re-circulation line 9. Pneumatic check valves 10 are located at each end of the feed line 8. By pressurising the check valves 10 fluid is prevented from passing through the feed line 8 and instead passes through the recirculation line 9 back to the return line 3 and to the tank 2.

The feed line delivers fluid to five boom sections 11 on each of which there are grouped four nozzles each nozzle comprising an air operated check valve 12. The check valve 12 is of the spring-loaded piston type, where a spring-loaded piston arrangement holds a seal against an outlet orifice and pressurised air is supplied to lift the seal away from the sealing face.

The system further comprises an air supply in the form of a compressor 13, a control box 14, an electronic regulator 15, a manually set regulator which controls high pressure shut off, a volume booster relay 17, a high pressure switching manifold 18, a low pressure manifold comprising a bank of non-return valves 19 and an exhaust valve 20. The air supply pressurises an air line 21 which is connected the electronic regulator 15, the manually set regulator 16, the volume booster relay 17, the high pressure manifold 18 and the bank of non-return valves 19. The electronic regulator 15 senses the pressure in the feed line by sensing the pressure in the fluid pressure regulator 7. A signal is sent from the regulator 15 to the control box 14.

Alternatively, the regulator 15 may receive a signal from a control dial on the control box and regulate the fluid pressure regulator 7.

To switch a particular boom section 11 on it is necessary to supply high air pressure through airlines 22 to the check valves 12 of that section. The high-pressure regulator 18 comprises a manifold having an air inlet and a plurality of air outlets. The manifold further comprises a plurality of electrically activated valves which open or close the outlets upon receipt of a signal. If the operator wishes to spray normally, using all the boom sections he would press one of the buttons on the control box which is wired so that a signal is sent to the regulator 18 causing all the outlet valves connected to air lines 22 to open. Air at the pressure set by the high-pressure regulator 16 is then supplied to all the check valves 12, and they are opened and hence fluid is pumped through the nozzles. It should be noted that if the operator wishes to spray normally he will also set the control box so that an electronic signal is sent to the manifold 18 causing the valve supplying air line 23 to open so that the check valve 10 at the upstream end of the spray line is closed, thereby preventing return to tank 2 of spray fluid. He will also set the control box so that a low-pressure signal (lower than the spray fluid operating pressure) is sent to the upstream check valve 10, thereby ensuring that fluid can flow therethrough and into the spray line 8.

It can be seen that each airline 22 is connected to one of the valves in the low-pressure manifold 19 by an airline 24. Each of the non-return valves is connected to a common airline 25 which is connected to a volume booster relay 17. The volume booster relay has two air inputs 26 and 27, the input 26 coming from the downstream side of the high pressure regulator 16, and the input 27 coming from upstream of the regulator 16. The volume booster relay 17 creates a negative air pressure bias so that the air pressure in line 25 is not only lower than the pressure set by the high pressure regulator but also lower than the spraying pressure of the fluid in the fluid line when spraying.

When it is desired to turn off any one of the sections 11, it is necessary for the air pressure in the air lines 22 and hence the check valves 12 to fall below the pressure exerted by the springs in the check valves. This is achieved by opening the exhaust valve 20. The exhaust valve is a solenoid operated valve, and the controller is set up so that when the operator presses the button on the control box to open the exhaust valve 20 the valve is opened, but only for a pre-determined time. The control box may incorporate an RC circuit to facilitate this. When the air pressure in the air lines 22 falls below the air pressure in air line 25, the valves in low pressure manifold 19 open and supply air to the check valves at a pressure which is just below the pressure required to lift the seals in the check valves off their seats against the force of the springs. For example, if the spring exerts a pressure of 3 bar, the high pressure regulator may be set at a pressure of 3.05 bar, and the volume booster relay may be set at a pressure of 2.95 bar. The pre-determined time for which the exhaust valve is open is sufficient for sufficient air to exhaust from the system to allow the pressure in the relevant airlines and nozzles to fall to the pressure set by the volume booster relay.

The provision of check valves 10 at each end of the spray line 8 allows the spray line to be isolated, thereby permitting re-circulation through the return line, and the tank. This allows the majority of the system to be flushed out without fluid having to pass through the spray line and the nozzles. This is of great environmental importance. Traditionally, when a sprayer operator has needed to flush out the tank and spray lines, after emptying the tank, he filled it with water and then emptied the tank through the nozzles, often into a drain, ditch or watercourse. Clearly this is undesirable because the water would be contaminated at a low level with chemical or fertiliser. With the system of the present invention, the spray line 8 can first be isolated. With the tank emptied, a relatively small amount of water can be introduced into the tank and this water can be pumped around the system a number of times. The contents of the tank can then be emptied into a dedicated tank for contaminated fluid. The spray line 8 can also be flushed out by opening both the check valves 10 whilst no high-pressure air is supplied to the check valves 12, thereby ensuring that they are shut.

Of course it is necessary to flush out the nozzles themselves, but the residual volume of fluid contained in the nozzles is small compared to the total residual volume of fluid in the system, and therefore the environmental effect of a sprayer having a control system according to the invention is far less.

The sprayer system shown in FIG. 1 has considerable advantages over existing sprayers using air actuated piston check valves, such as the AIR CHEMSAVER from Spraying Systems Co. These advantages stem from the supply of air to the valve at a pressure marginally below the pressure generated by the spring. Since only a small volume of air is exhausted, power is not wasted in generating compressed air. Additionally, the time taken to open the check valves is small because only a small volume of air needs to be supplied to overcome the pressure generated by the spring. If time required to build up sufficient air pressure is relatively long, then circumstances could arise where the operator has turn the sprayer vehicle at the headland and is ready to start the next bout, but there is insufficient air pressure to open the check valves. This could lead to parts of the field being under sprayed.

The check valves 12 may be replaced by other active check valves, for example air actuated diaphragm check valves of the type described in UK patent application no 9710834.4, and PCT/GB98/01546. In such valves when air pressure higher than the spray fluid pressure is exerted on the diaphragm the valves are shut off, and when the air pressure falls below the spray fluid pressure the fluid pressure opens the valves. It is therefore necessary to invert the controls in the controller 14 so that when the operator switches a boom section on, the valves in the high pressure manifold 18 are closed and air at low pressure from volume booster relay 17 passes through the air line 25 through the non-return valves of low pressure manifold 19 and air lines 24 to airlines 22 and to check valves 12 where air pressure below the spraying fluid operating pressure is exerted on the diaphragms. In this mode the diaphragms function as check valves, the diaphragms preventing flow of spray fluid when the spray fluid pressure falls below the spraying pressure.

The high-pressure air distributed through the high-pressure manifold 18 allows any particular section 11 to be shut-off whilst the remaining sections function normally. When it is desired to switch off a particular section 11 the relevant valve in the manifold 18 is opened and air at a pressure higher than the spraying pressure is exerted on the diaphragms of the check valves 12, thereby closing them. When the operator needs to switch the relevant section 11 on again, he opens exhaust valve 20, which is set to open for a pre-determined time, allowing the pressure in the diaphragm chamber to fall to the pressure in air line 25.

A 24 volt supply powers the electrically driven components of the invention. This allows for greater flexibility than does a 12 volt supply. All control signals can be transmitted between the sprayer and the cab (where the control box would usually be mounted) via one two wire connection. This avoids the use of bulky wiring looms which are prone to damage as they pass from the cab to the sprayer. Furthermore, the fitting and removal of equipment and maintenance and programming is much easier where only two wires are used.

The sprayer shown in FIG. 1 can be modified so that it is possible to control one or more nozzles 12 individually, as opposed to in a group. To do this it is necessary to use manifolds 18 and 19 with a greater number of ports, or a greater number of manifolds.

By providing a second high pressure manifold 18, and a second low pressure manifold 19 it is possible to control a second set of nozzles 11. The second set of nozzles could be provided on the same spray line or on a second spray line. It can be desirable to provide nozzles of different sizes, different sized nozzles being required for different purposes, for example spraying liquid fertiliser and chemicals. Changing over a set of nozzles is time consuming. Providing two sets of nozzles allows the same machine to be used for two different purposes with no down time.

It is also advantageous to provide two sets of nozzles so that the application rate at a given location can be customised to suit the requirements of the particular area. For example a particular area may have a heavier infestation of black grass than the rest of the field. It would be more efficient to apply more herbicide to the particular area in one pass, rather than covering the same area twice. The nozzles may have different sized apertures, and could be used individually or in combination to provide three different application rates.

Figure 3:
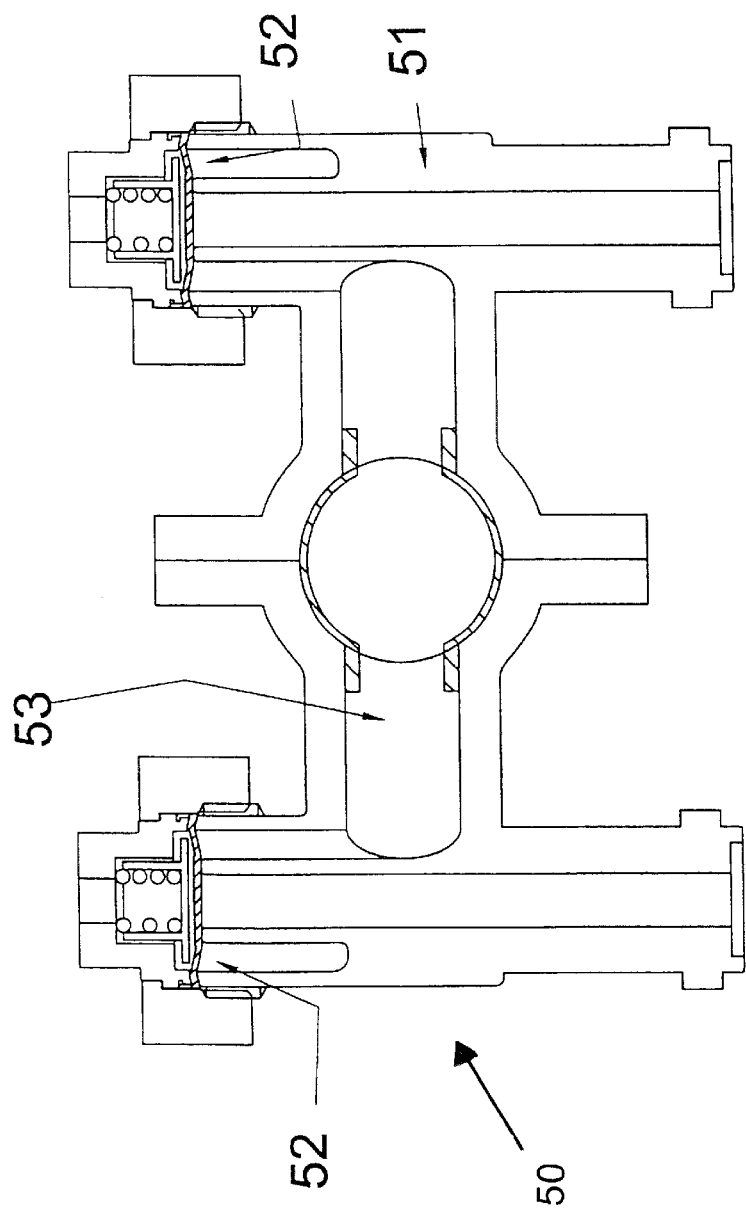
FIG. 3 is a cross section of a check valve.

FIG. 3 shows a sprayer fitting 50 which incorporates two nozzle/applicator mounting bodies 51, each being provided with a diaphragm check valve 52, and sharing a common feed passage 53.

The controller 14 can be programmed to advance or delay the switch over from one set of nozzles to another in order to avoid over or under dosing.

Figure 2:
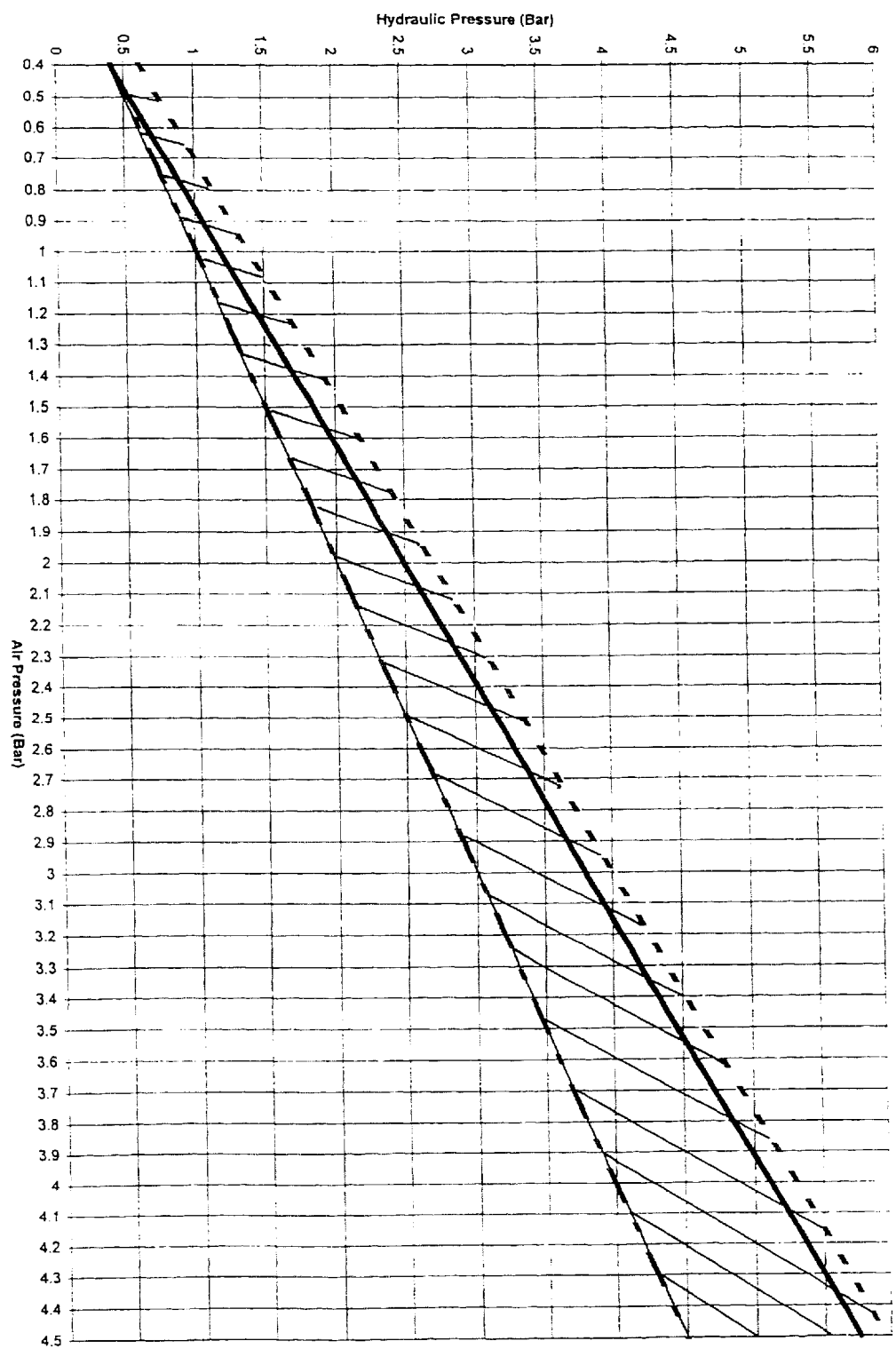
FIG. 2 is a reference chart showing operation of a controller according to the invention.

FIG. 2 shows a reference chart illustrating the relationship, for a diaphragm valve, between hydraulic pressure represented by the solid line (spray fluid pressure), air pressure for the high-pressure air in manifold 18 represented by the upper broken line, and the low pressure represented by the lower broken line from the volume booster relay 17. The shade area represents the volume of air exhausted during switch over from on to off or vice versa of a nozzle or group of nozzles.

Figure 4:
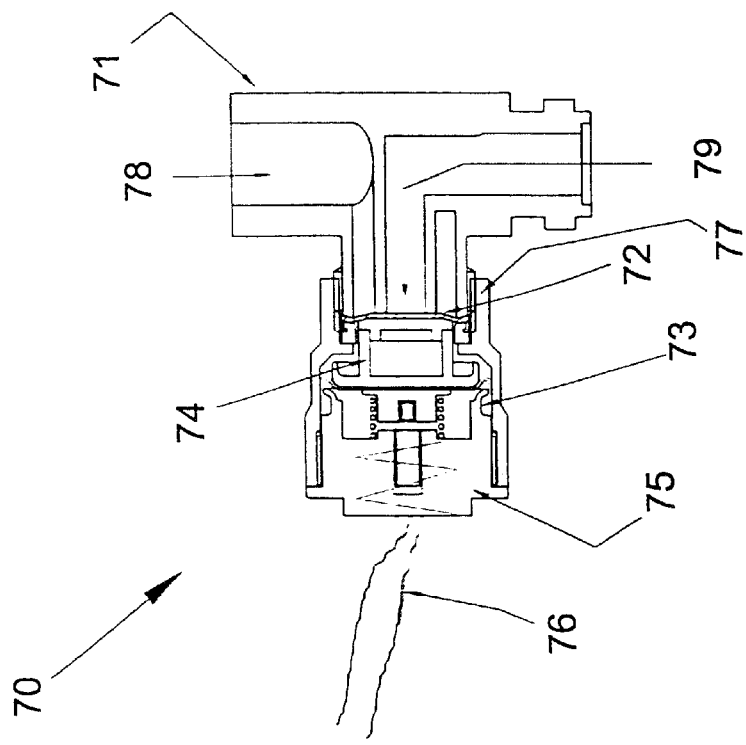
FIG. 4 is a cross section of a check valve incorporating a rolling diaphragm and an electronically actuated solenoid.

FIG. 4 shows a check valve 70 in which an electronically operated solenoid is used to provide first and or second operating means. Fluid is delivered under pressure to the inlet 78 of the valve body 71. A solenoid 75 fitted with seals 73 and 72 and an actuator piston 74 is fitted to the check valve body 71 by screw threads 77. The solenoid is normally in its closed position causing the actuator piston 74 to force the lower diaphragm 72 to seal the inlet 78 of the valve from the outlet 79. When the solenoid is energised the actuator piston 74 is drawn towards the solenoid coil 75 allowing liquid to pass from the inlet 78 to the outlet 79 to which a nozzle or applicator would normally be fitted using suitable securing means. The solenoid is connected to the controller by means of a two wire connection 76 and may be fitted singly to the sprayer or in multiples and controlled accordingly. The controller may be configured to energise the solenoid rapidly so that the valve opens and closes. It may be configured so that the frequency at which the valve opens and closes may be varied in accordance with changes to ground speed or to effect changes to required pressure or flow passing through the valve. Similarly the controller may be configured to control the extent or duration to which the solenoid is in either the open or closed position by means of Pulse Width Modulation and again might adjust these inputs in accordance with changes to ground speed or to effect changes to required pressure or flow passing through the valve.

The valve is fitted with a second rolling diaphragm 73 which isolates the electrical aspects of the solenoid from ingress of liquid in the event that diaphragm 72 might fail or where assembly to the sprayer is incorrect causing liquid to pass from the valve into the solenoid mounting. The rolling diaphragm 73 also provides a friction free carrier for the actuator piston, reducing or obviating the need for maintenance. The electronically operated solenoid diaphragm check valve offers significant advantages over other types of solenoid valve in this type of application because none of the wetted parts of the valve have influence on the mechanical function, unlike spool or sliding piston type valves which require constant lubrication by means of a suitably viscous liquid.

Figure 5:
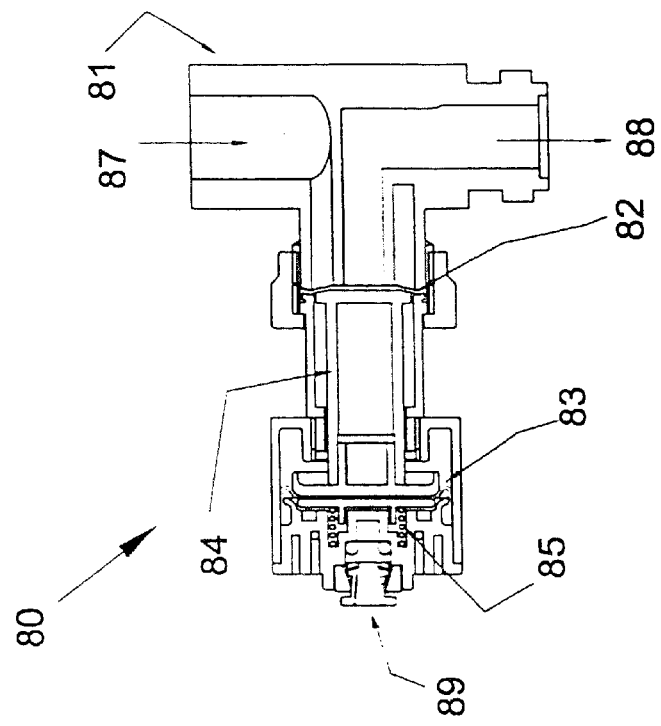
FIG. 5 is a cross section of an air operated check valve incorporating a rolling diaphragm and a spring to act on the assembly carrying this diaphragm so that the valve remains shut when the operating means is removed.
Figure 6:
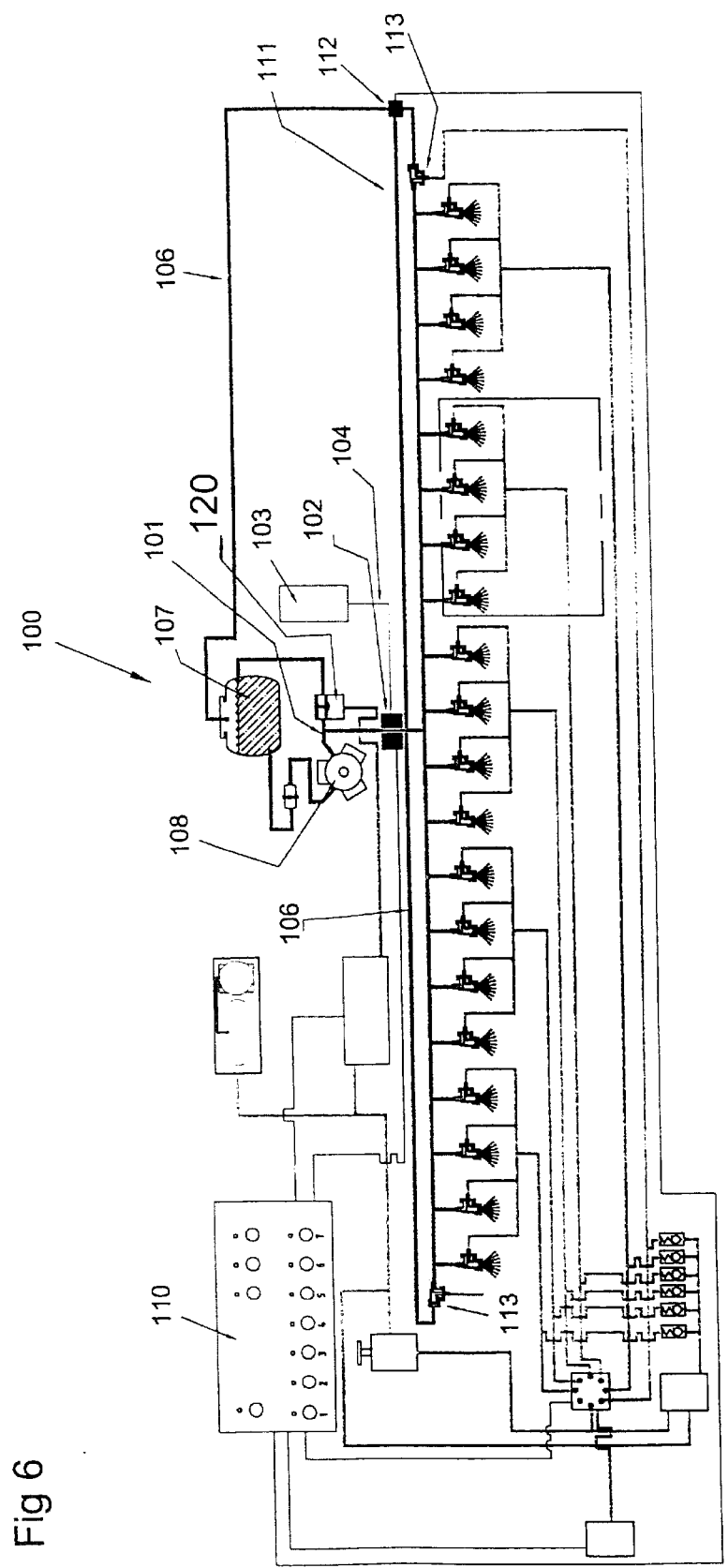
FIG. 6 shows a schematic layout of a sprayer according to the invention to which is fitted a method for injecting chemicals directly into the spray line.

FIG. 5 shows a check valve 80 using air to provide first and/or second operating means. Air is supplied via an inlet 89 to a chamber in which is mounted, and properly sealed, a rolling diaphragm 83. The rolling diaphragm carries an actuator piston 84, which extends away from the inlet chamber through a housing vented to atmosphere and engages with a second diaphragm 82 which is mounted on the aforesaid housing. This whole assembly is then screw-threaded on to the check valve body 81 so that the second diaphragm 82 is able to seal the inlet chamber 87 from the outlet chamber 88 when air pressure is applied to the air inlet. A coil spring 85 is fitted within this area to act on the exposed face of the rolling diaphragm 83 causing a positive load to be transferred onto the lower diaphragm 82 which ensures that if the air supply is removed the valve will remain shut unless the fluid pressure in inlet chamber 87 generates a load on the exposed face of diaphragm 82 greater than the load being applied by the spring. Fluid is delivered under pressure to the inlet 87 of the valve body 81. The presence of a rolling diaphragm is extremely beneficial because it does not require any lubrication and improves reliability of check valves. Correspondingly, if the area of the diaphragm is effectively greater than that of the sealing area of the check valve body—represented by the exposed surface area of the second diaphragm 82—lower actuating pressures can be applied at the air inlet or alternatively the control of high hydraulic pressures in the valve body 81 can be achieved. The air being supplied to inlet 89 will preferably be controlled by the main spray control as described and will comprise first and second operating means. Because of the differential working areas within the valve the first and second operating means may be at pressures lower than the hydraulic pressure passing through the valve. The extent to which they are lower must not exceed the ratio between effective surface areas of the rolling diaphragm 83 and the second diaphragm 82. The check valve may be fitted singly to the sprayer or in multiples and controlled accordingly. The controller may be configured to switch rapidly between first and second operating means allowing the valve to open and shut rapidly to control fluid flow through the check valve, and might vary the rate at which the valve is opened and closed in accordance with changes to ground speed or to effect changes to required pressure or flow passing through the valve FIG. 6 shows a schematic layout of a sprayer 100 which is essentially as shown in FIG. 1 but to which is fitted a means of adding neat chemical 103 to the spray line 106 as the machine operates. This addition is extremely advantageous because it enables the sprayer tank 107 to be filled with clean water and when spraying to ensure that only what chemical is actually required is applied. In the application of liquid fertilisers it might be necessary to vary the rate at which the fertiliser is applied in a given area while also applying fertiliser release inhibitors to the fertiliser. The inhibitors must be applied at a fixed rate for a given area thereby preventing the mixing of chemical in one tank.

In operation the sprayer pump 108 delivers water or fertiliser to the spray line feed 101. The sprayer controller 110 regulates the flow and or pressure at which the water or fertiliser is delivered by the pump by means of the regulating valve 120: The water passes through the chemical admission apparatus 102 whilst chemical is delivered from a reservoir 103 via a feed line 104 and fed directly into its stream. The combined liquids then pass to the sprayer outlets by the main supply line 106. It can be seen that the sprayer is equipped with a facility allowing fluid in the main feed line 106 to be circulated within the line or if necessary returned to the main sprayer tank 107. The circulation is effected by opening valves 113 which allows fluid to flow into line 111 which loops back to a point downstream to the chemical admission apparatus 102. The control 110 may be configured to adjust the amount of chemical being admitted to prevent secondary dosing of fluid if circulation is selected during the spraying process. Alternatively valves 113 may be opened allowing fluid into the re-circulation line 111 and a three way valve 112 may be remotely opened allowing the fluid to return either to the main tank or to a second tank - not shown. With this facility the chemical admission apparatus can be isolated and clean water introduced to both the main feed line 106 and the re-circulation line 111 and the lines cleansed. However, if the objective is to ensure that water in the main tank remains uncontaminated by chemical, then clearly the fitting of a second tank would be required to house contaminated liquids, which can then be disposed of in a proper manner at the farm or where required. The fitting of a re-circulation line to the type of sprayer described is advantageous in that it allows chemical to be admitted to the spray line 106 and transported to the outlets at the desired concentration prior to commencement of actual spraying, thereby ensuring that when the operator opens the relevant section or group of outlets chemical is being sprayed at the correct concentration. The controller 110 may be configured so that it controls the rate at which chemical is admitted to the fluid flow and may regulate this rate in accordance with changes to ground speed or in response to signals from a manually plotted or GPS co-ordinated mapping system which specifies changes in rates being applied. The controller may control fluid flow and/or pressure of the water passing through the chemical admission point independently to that apparatus.

Figure 7:
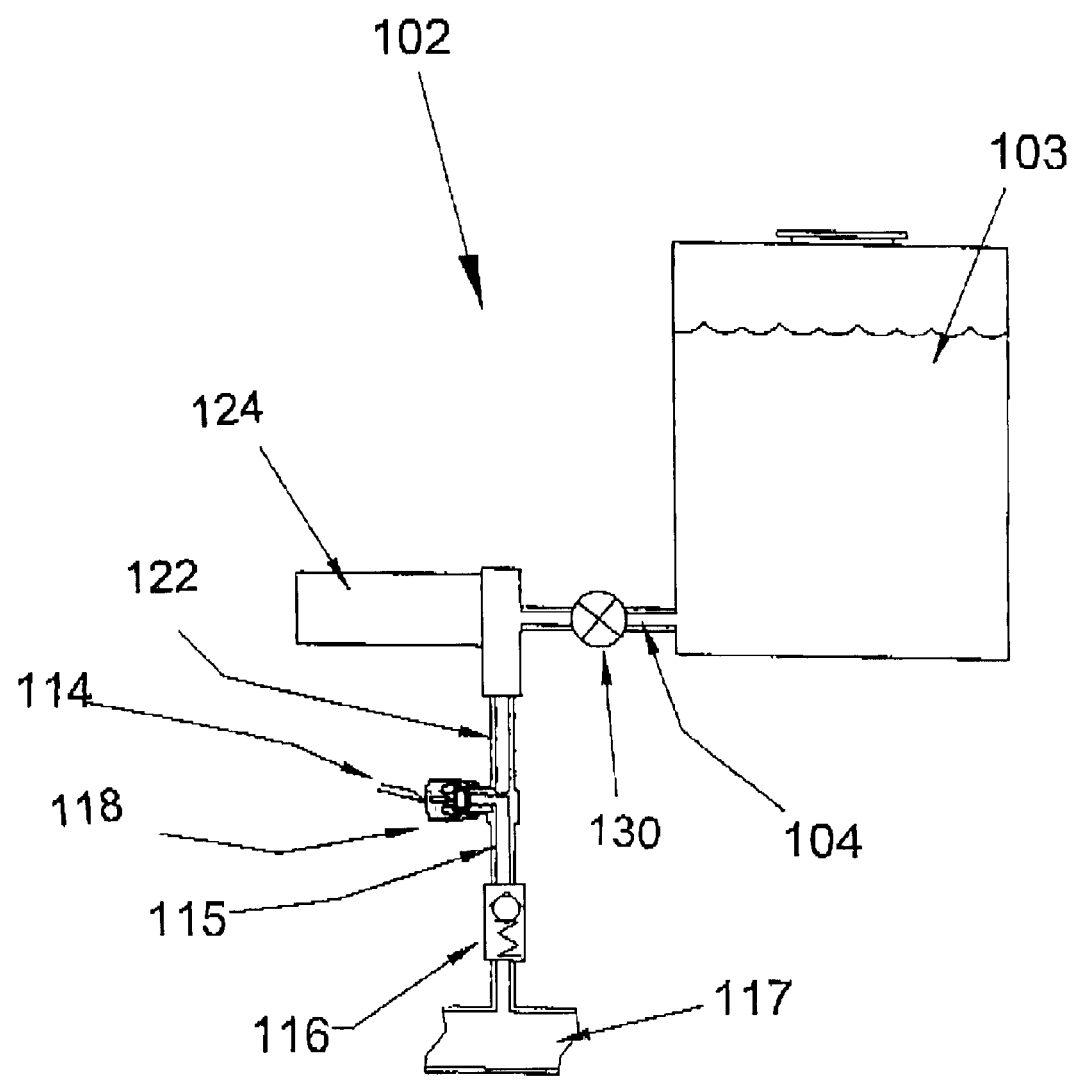
FIG. 7 shows a schematic layout of the apparatus required to inject chemical into the spray line using check valves adapted to metering valves and having operating means according to the invention.

FIG. 7 shows a schematic layout of apparatus 102 used for admitting neat chemical to a spray line fitted to a sprayer controlled in accordance with the invention and using a second check valve 118 having first and or second operating means adapted for the purpose of precisely admitting chemical to the main spray feed line 117 whilst being controlled by the sprayer control 110. A chemical reservoir holds a quantity of neat chemical 103 such as may be required for treatment of pests, weeds or the likes. The reservoir might be the container in which the chemical manufacturer supplies the chemical, or it might be a purpose made reservoir to which the chemical is transferred. The reservoir might also comprise equipment know as a "closed transfer" type system in which chemical is supplied in sealed containers which connect to fittings of a type specific to that type of container which allow the chemical to be transferred to the sprayer without risk of exposing the chemical to the operator.

The reservoir has an feed line 104 through which the neat chemical 103 can flow. A tap 130 is fitted to the exit of the reservoir so that the chemical supply can be isolated. A small pump 124 of sufficient size to deliver whatever maximum pressure and flow might be required, draws neat chemical from the reservoir and delivers it under pressure to a delivery line 122. The pump may be controlled by the spray controller 110, or it might run at a fixed rate providing a desired constant head in line 122. Line 122 feeds into the inlet of a the second check valve 118 of the type previously described acting in response to the controller and connected to this or to operating means by connection 114. The valve actuates in response to changes in forward speed, as a result of chemical rate changes that might be required by the operator, or as specified in commands from a mapped input, such as may occur when the control is integrated in a GPS mapping system, and the control signals may come from the controller which can be configured to provide these commands. The valve may be actuated rapidly between its ON position and its OFF position, allowing neat chemical under pressure in line 122 to pass through the second check valve 118 into the delivery line 115. By changing the frequency at which this switching takes place, the volume of chemical added can be accurately regulated. Alternatively, the valve opening and closing can be modulated to control the duration of the valve in the ON or OFF position and again the chemical passing through it may be accurately regulated. The sprayer control 110 might adjust the actuating means and at the same time adjust delivery rate of the pump 124 so that the desired rate passing through the admission apparatus is a combination of pressure being delivered by pump 124 and also opening times of the second check valve 118. Alternatively, the actuation means may be controlled independently of the other sprayer functions as might be required by the operator. The process by which chemical passes through the check valve is continuous whilst spraying takes place so that fluid in the delivery line 115 is forced towards the main feed line 117 at all times. The main feed line 117 represents the line supplying the sprayer outlets. To prevent liquid being delivered through the feed line from entering the admission apparatus a non-return valve 116 is provided that allows flow from the check valve delivery line 115 to pass into the feed line 117 but not the other way. The point at which the chemical line joins the feed line 117 may be provided with suitable fittings to ensure that adequate mixing of the chemical with the carrying fluid takes place prior to the combined liquids reaching the first of the spray outlets.

The chemical admission apparatus 102 may comprise means to allow one chemical to be admitted to the feed line or alternatively might comprise a series of like "modules" which allow a selection of chemicals to be admitted and the control configured to provide control means as required. The check valve 113 providing chemical admission can be positioned as shown within the main spray feed plumbing or alternatively could be mounted adjacent to each spray outlet or nozzle or at other points on the sprayer boom and provided with delivery lines 122 as required from a suitably located pump or pressurizing means. Where the check valves are mounted at the sprayer outlets, the control may be configured to control each admission valve to vary the flow rate relative to neighbouring admission points as might be required for a variable rate application in accordance with commands from a GPS controlled mapping inputs, or from real time visual monitoring apparatus.

Figure 8A:
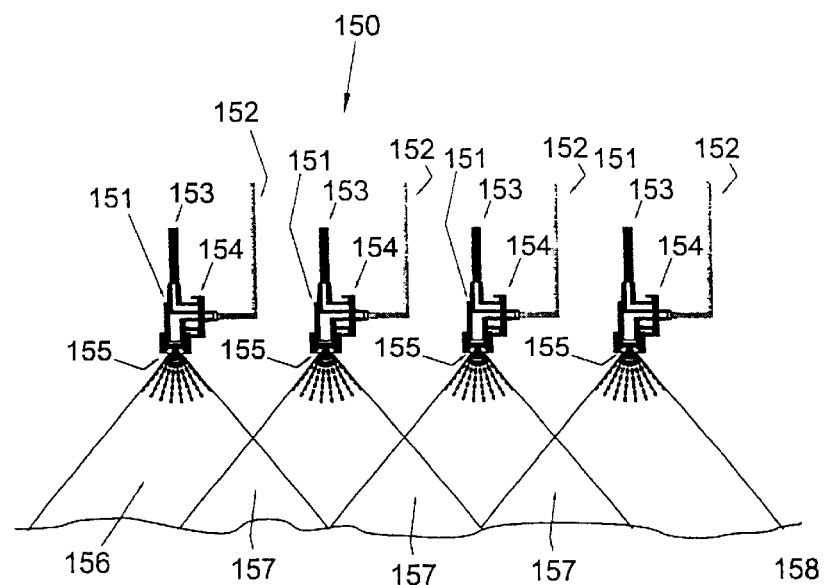
FIG. 8a shows a schematic view of spray nozzles, arranged on a sprayer boom of the prior art, showing fluid passing through conventional Fan type nozzles.

FIG. 8a schematically shows a front view 150 of 4 sprayer outlets, each fitted with a flat fan type nozzle mounted on a sprayer boom in operation. Each outlet is fitted with a check valve 151 of the type described. Mixed chemical is delivered to the check valve via line 153. A diaphragm arrangement 154 is fitted to each check valve and an operating signal is supplied via line 152. This might be an electronic signal, where the actuating means is a solenoid, compressed air or hydraulic fluid. The actuating means prevents flow of chemical to the nozzle 155 by closing the diaphragm. Alternatively, the actuating means opens the valve, allowing liquid to pass into the nozzle and be distributed in accordance with that nozzle's operating characteristic. The nozzle's operating characteristic comprises amongst other things a spray pattern 156 which, as illustrated in the Figure, is a fan shaped deposition for a flat fan nozzle. The included angle of the fan generated by the nozzle is typically between 60° and 130°. The positioning of check valves 151 on the spray boom is so arranged that when the spray boom is at the most advantageous spraying height from the ground 158, the spray pattern 156 effectively overlaps the pattern generated by the adjacent nozzle by 50%. This overlap is represented by the area shown as 157. This overlapping ensures that full spray coverage of the ground 158 is achieved over the spray boom width. The spray nozzles are arranged with a radial offset so that, though an overlapping is achieved, there is no interference of one spray nozzle pattern with its neighbour. Sprayers can be equipped with suitable apparatus to fix the height of the spray boom in relation to the ground so that the spray boom largely follows the ground contours over the sprayer width. The height may be selected to achieve the most advantageous spraying function and the equipment might be manually adjusted or automatically controlled. The control function of the height setting means may be part of the main sprayer control.

Figure 8B:
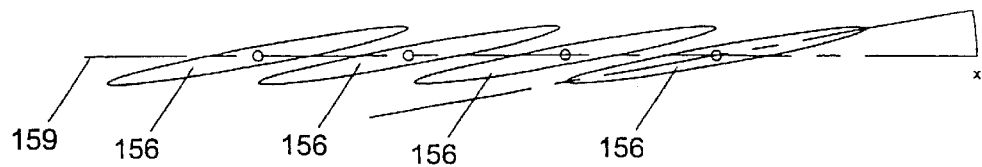
FIG. 8b shows a plan view of the spray pattern for a number of conventional Fan type nozzles as would normally be arranged on a sprayer boom of the prior art.

FIG. 8b shows a plan view of the arrangement shown in FIG. 8a and illustrates how the nozzles positioned on spray line 159, when given a radial offset, shown by angle X, overlap without causing interference between nozzle spray patterns.

Figure 9A:
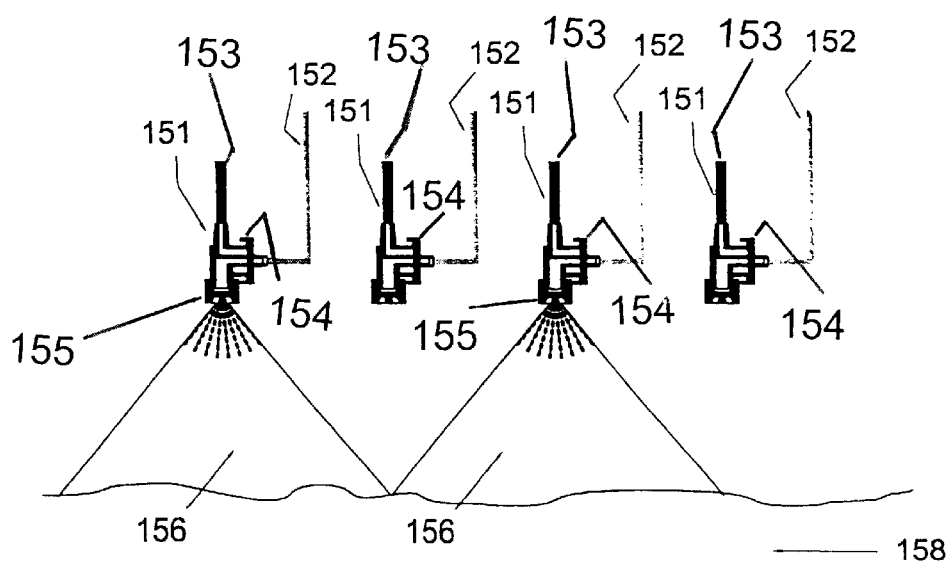
FIG. 9a shows a spray pattern of fluid passing through conventional Fan type nozzles controlled in accordance with the invention.
Figure 9B:
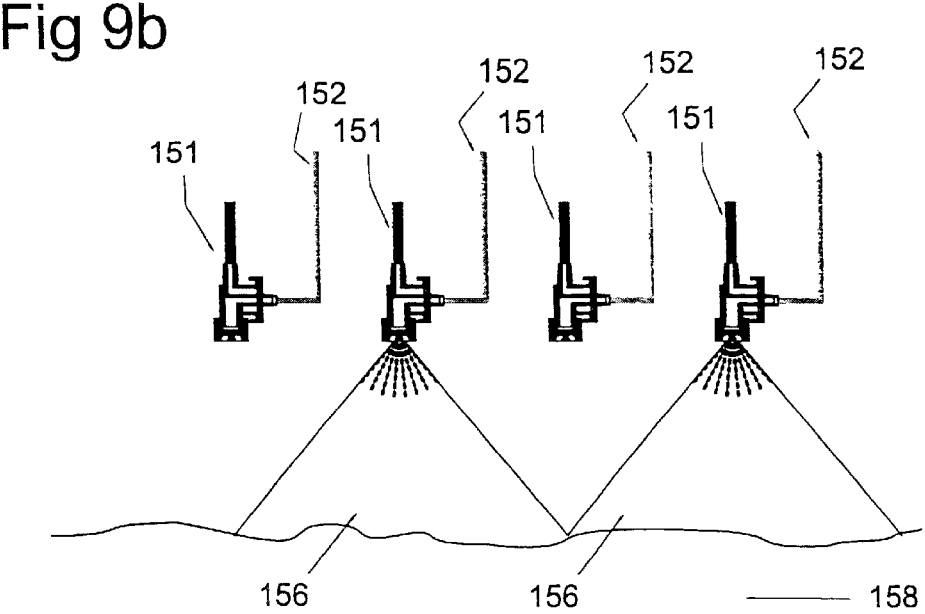
FIG. 9b shows a spray pattern of fluid passing through conventional Fan type nozzles controlled in accordance with the invention.

FIG. 9a schematically shows a front view of 4 sprayer outlets each fitted with a flat fan type nozzle mounted on a sprayer boom in operation. Each outlet is fitted with a check valve 151 of the type described. Mixed chemical is delivered to the check valve via line 153. A diaphragm arrangement 154 is fitted to each check valve and an operating signal is supplied via line 152. As with the embodiment of FIG. 8, this might be an electronic signal, where the actuating means is a solenoid, compressed air or hydraulic fluid. The actuating means prevents flow of chemical to the nozzle 155 by closing the diaphragm. Alternatively, the actuating means opens the valve, allowing liquid to pass into the nozzle and be distributed in accordance with that nozzle's operating characteristic, as is shown by the two spray patterns being generated by two of the four nozzles. FIG. 9a shows that, by having two alternative nozzles open, effective overlap of the spray pattern does not occur and therefore it can be assumed that 50% of the rate which would normally be applied if all four nozzles were operating is actually being sprayed. The construction of most commercially available flat fan nozzles is such that when flow through the nozzle takes place the droplets formed by the nozzle are of a mean size which are distributed evenly throughout the spray pattern being generated. However, it is also known that droplets contained within the outer extremes of the pattern are more difficult to control in terms of size. This occurrence is of some concern because the uncontrolled droplet size might not maximise the efficacy of chemical being applied. On this understanding sprayers were configured so that an overlap of nozzles was incorporated so ensuring that all parts of the crop received sprayed droplets within the desired spectrum. It would therefore not be particularly beneficial if the nozzles were operated as in FIG. 9a continuously for the duration of a spraying operation. It would, though, be beneficial if the sprayer control could switch alternate nozzles rapidly between the situation shown in FIG. 9a and that shown in 9b so that a full coverage was effectively maintained, but with a flow rate proportional to that time which any of the valves are open. Such an arrangement would allow the fitting of nozzles 155 which are known to have beneficial spray pattern characteristics, maximising efficacy of chemicals passing through, or which are considered as optimal application means for particular spraying conditions, but which can achieve these only at high flow rates. By alternating the precise opening time of a nozzle with that of the nozzle's neighbours, full coverage of the chemical being applied across the width of the sprayer can be ensured. The control signal would be generated within the spray control and the inputs characterised in terms of required flow considered suitable for the scope of a particular nozzle's operating spectrum. The control that is effected is that of an increased range of applications for any one particular nozzle type or spray characteristic.

I claim:

1. A device for delivering a controlled dose of a fluid to an outlet from a fluid supply at an operating pressure, the device comprising:

an actively operable check valve;

pressure exerting means to selectively exert first and second pressures on the check valve such that when one of the first and second pressures is exerted on the check valve the valve prevents the passage of fluid at operating pressure through the outlet, and when the other pressure is exerted on the check valve the valve permits the passage of spray fluid at operating pressure;

signal generating means to generate a control signal characteristic of the fluid operating pressure; and control means for deriving at least one of the said first and second pressures from the said control signal.

2. A device according to claim 1, wherein the control means is arranged to derive both the first and second pressures from the said control signal.

3. A device according to claim 2, wherein the first pressure is less than the operating pressure.

4. A device according to claim 2, wherein the second pressure is greater than the operating pressure.

5. A device according to claim 1, wherein the check valve comprises a rolling diaphragm mounted about a piston arrangement which acts on another diaphragm which creates a seal between the inlet and outlet of the valve.

6. A controller for a liquid spraying apparatus comprising at least one spray line provided with at least one outlet, the or each outlet being provided with a device according to claim 1.

7. A controller according to claim 6, wherein the or each outlet is provided with a nozzle or an applicator.

* * * * *